UNITED STATES PATENT OFFICE.

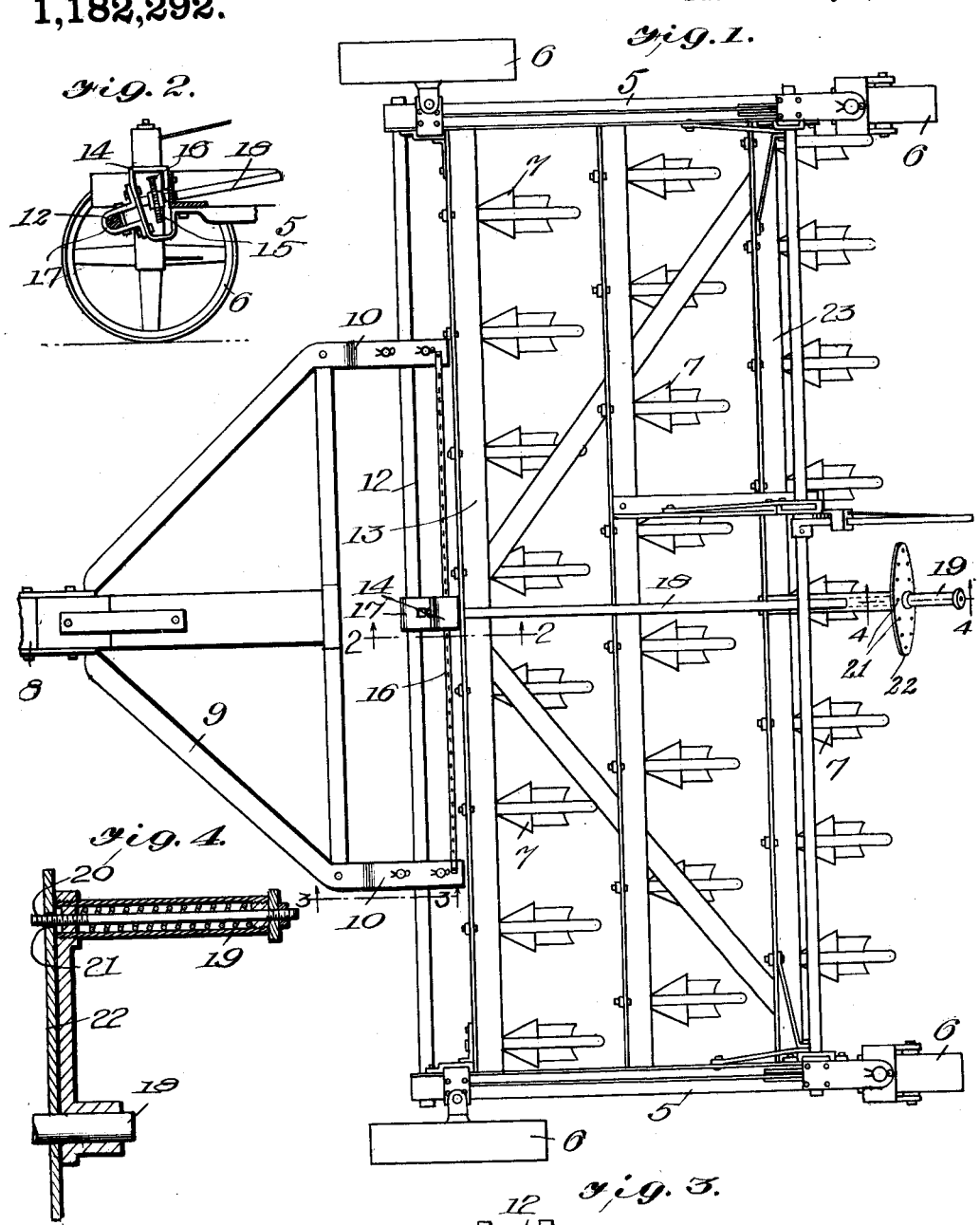

HERMAN C. MICHEL, OF DIXIE, WASHINGTON.

DRAFT-TONGUE.

1,182,292.        Specification of Letters Patent.        Patented May 9, 1916.

Original application filed July 22, 1915, Serial No. 41,273. Divided and this application filed October 5, 1915. Serial No. 54,213.

*To all whom it may concern:*

Be it known that I, HERMAN C. MICHEL, a citizen of the United States, residing at Dixie, in the county of Walla Walla and State of Washington, have invented certain new and useful Improvements in Draft-Tongues, of which the following is a specification.

This application is a division of my application filed July 22, 1915, Serial No. 41,273, the same disclosing an agricultural machine embodying certain novel features claimed in said application, and also disclosing an adjustable draft tongue, which latter is the subject matter of the present application.

The present invention has for its object to provide a novel and improved means for shifting the draft tongue of an agricultural machine, such as a cultivator, plow, harrow, seeder, etc., so that the machine can be held on the side of a hill, the shifting means being so constructed and arranged that the tongue may be adjusted while the machine is in motion, and without stopping the same.

In order that the invention may be better understood, reference is had to the accompanying drawing, in which—

Figure 1 is a plan view of an agricultural machine showing the application of the invention, and Figs. 2, 3 and 4 are sectional details in the lines 2—2, 3—3 and 4—4, respectively, of Fig. 1.

Referring specifically to the drawing, 5 denotes the frame of an agricultural machine, mounted on wheels 6, and carrying earth-working elements 7. The machine here illustrated is a combined weeder and cultivator; however, it is to be understood that the invention is not limited to any particular machine, but may, with equal facility, be applied to plows, harrows, seeders and all other agricultural machines.

The draft tongue of the machine is shown at 8, it being carried by a hound frame 9 having yokes 10 at its rear ends, said yokes carrying rollers 11. Between these rollers and the yoke branches extends a shaft 12 carried by a front cross bar 13 of the frame 5, and extending transversely of said frame. The hound frame is thus slidably mounted on the shaft 12, so that it may be moved laterally from the center, to put the draft on either side, and thus hold the machine on a side hill.

The following means are provided for shifting the tongue: At the longitudinal center of the machine, the cross bar 13 carries a bracket 14 which supports a sprocket wheel 15. The yokes 10 are on opposite sides of the sprocket wheel, and they are connected by a chain 16 trained over the sprocket wheel. It will therefore be seen that the hound frame 9 is lifted on the shaft 12, in either direction, when the sprocket wheel is turned. The bracket 14 carries a support 17 for the intermediate portion of the shaft 12. The sprocket wheel 15 is operated by a shaft 18 on which it is fast, said shaft extending to the rear end of the machine, and being here equipped with an operating crank handle 19, carrying a spring latch 20 engageable with keeper apertures 21 in a plate 22 carried by the rear cross bar 23 of the frame 5. The plate 22 also serves as a support for the rear end of the shaft 18, its front end being supported by the cross bar 13.

I claim:

In an agricultural machine, a wheeled frame, a transverse shaft mounted at the front end of the frame, a draft device support slidably mounted on the shaft, a transverse chain connecting opposite sides of the said support, a sprocket wheel carried by the frame between the sides of the draft device support, over which sprocket wheel the chain passes, and means for operating the sprocket wheel to shift the draft device support along the shaft.

In testimony whereof I affix my signature in the presence of two witnesses.

HERMAN C. MICHEL.

Witnesses:
E. D. MATTINSON,
E. E. SANZE.